United States Patent Office 2,852,904
Patented Sept. 23, 1958

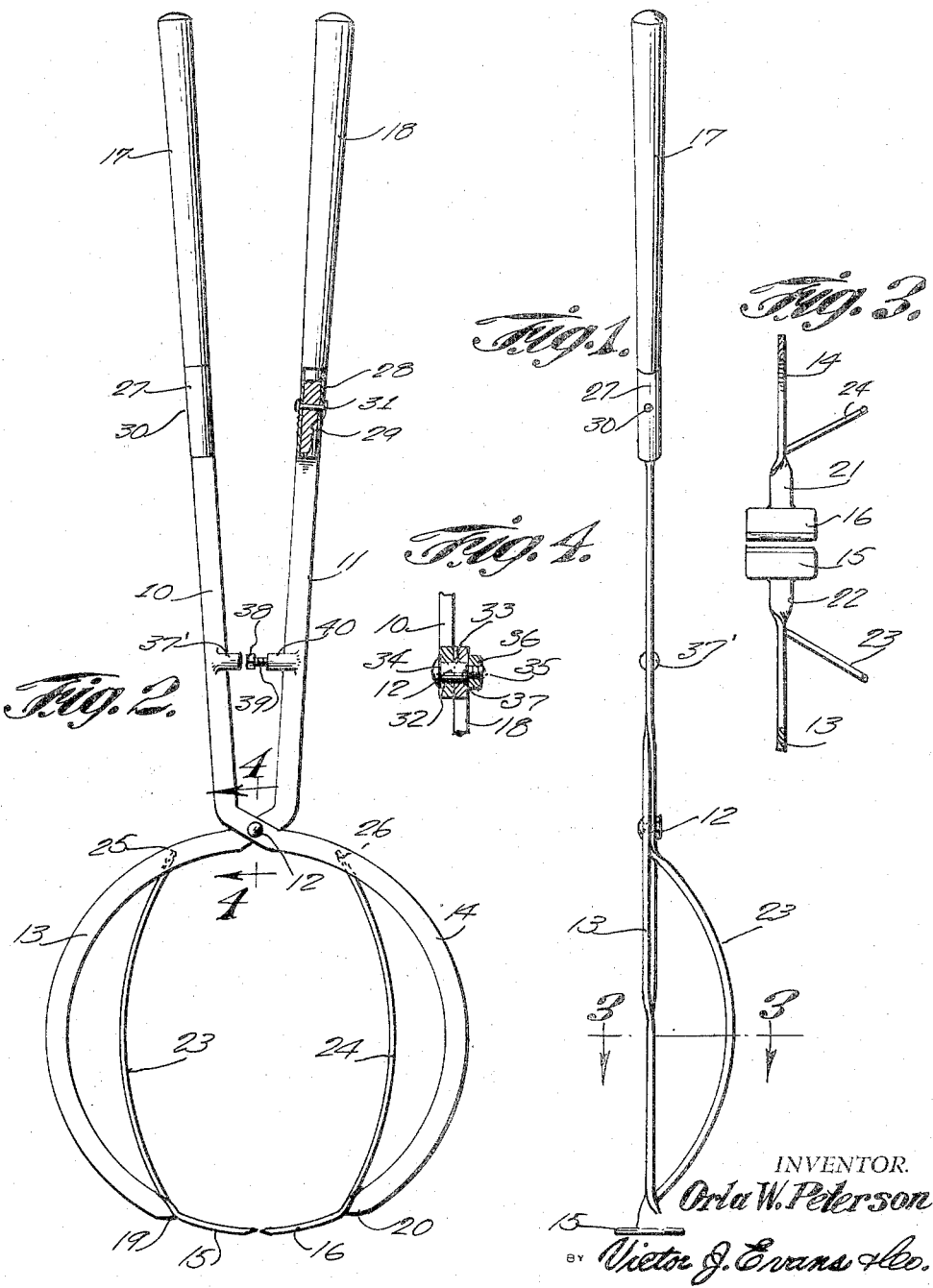

2,852,904

CABBAGE HARVESTER

Orla W. Peterson, Frankfort, Mich.

Application June 12, 1957, Serial No. 665,313

1 Claim. (Cl. 56—327)

This invention relates to tools used in harvesting produce, and in particular a pair of cutting blades carried by ends of outwardly bowed arms with the arms extended from handles and provided with arcuate guards and wherein the handles are pivotally connected so that upon drawing the handles together the blades cut the stem of a head of cabbage or the like with the head retained in the arms by the guards.

The purpose of this invention is to provide a tool for cutting heads of cabbage which obviates the necessity of bending down to cut the cabbage close to the ground.

Various types of tools have been provided for harvesting produce and the like and various forms of shear blades have been provided on ends of handles, however, it has been found difficult to reach in under heads of cabbage to cut the stems without permitting heads to drop into the debris on the ground. With this thought in mind this invention contemplates a basket type cutting tool wherein blades on ends of arcuate arms are adapted to extend in below a head of cabbage to cut the stem and wherein upon severing the stem the head is gripped by guards on the arms so that the head may readily be placed into a carrier or the like without dropping upon the ground.

The object of this invention is, therefore, to provide a cabbage harvesting tool which prevents heads of cabbage, after being cut from the stems, dropping upon the ground.

Another object of the invention is to provide a cabbage picking tool which is of relatively light weight.

A further object of the invention is to provide a cabbage harvesting tool adapted to be actuated with the operator in an upright position in which the tool is of a simple and economical construction.

With these and other objects and advantages in view the invention embodies a pair of pivotally connected levers having handles extended from the ends thereof with arcuate arms having blades on extended ends extended from the pivotal mounting of the levers and which also includes arcuate guards positioned on one of the sides of the arms which provide a basket-like carrier for receiving and holding heads of cabbage.

Other features and advantages of the invention will appear from the following description taken in connection with the drawing, wherein:

Figure 1 is a side elevational view illustrating the improved cabbage harvesting tool.

Figure 2 is a front elevational view of the tool with parts broken away and shown in section.

Figure 3 is a sectional plan through the lower end of the tool taken on line 3—3 of Fig. 1 with the parts shown on a slightly enlarged scale.

Figure 4 is a cross section through the pivotal mounting of the handles and arms of the cabbage harvesting tool taken on line 4—4 of Fig. 2 and with the parts shown on an enlarged scale.

Referring now to the drawing wherein like reference characters denote corresponding parts the improved cabbage harvesting tool of this invention includes levers 10 and 11 pivotally connected with a bolt 12 and having arcuate arms 13 and 14 with cutting blades 15 and 16 on extended ends thereof extended from the lower ends of the levers and also having handles 17 and 18 extended from upper ends of the levers.

The lower ends of the bars forming the arms 13 and 14 are twisted through an angle of 90° at the points 19 and 20 forming flat sections 21 and 22 from which the cutting blades 15 and 16 extend.

Rods 23 and 24 providing guards extend upwardly from the twisted sections 19 and 20 to points 25 and 26 where upper ends of the rods are secured to the arms 13 and 14, such as by welding or the like.

The upper ends of the levers 10 and 11 are provided with sleeves 27 and 28 which are secured to the levers 10 and 11, such as by welding and pins 29 on lower ends of the handles 17 and 18 are secured in the sleeves 27 and 28 with suitable fasteners such as the rivets 30 and 31.

The bolt 12, by which the levers are pivotally connected extends through an opening 32 in the lever 10 and also through an opening 33 in the lever 11 and one end of the bolt is provided with a head 34 and the other with a threaded stud 35 on which a nut 36 is threaded. The bolt is provided with a shoulder 37 to prevent the nut binding the levers together so that the levers may be readily operated.

The lever 10 is provided with a lug 37' that is positioned to engage a head 38 of a screw 39 that is threaded in a boss 40 on the lever 11 whereby with the head 38 engaging the end of the lug 37 the closing movement of the handles is limited and this movement is adapted to be adjusted by the screw 39 to prevent the sharp edges of the cutting blades coming together as the stem of a head of cabbage is cut.

The levers of the tool may be formed of steel, or other suitable material and as heads of cabbage are cut thereby they may readily be placed in carriers or the like.

Although the device is described as being particularly adapted for heads of cabbage, it will also be understood that it may be used for lettuce and other products.

It will be understood that modifications, within the scope of the appended claim, may be made in the design and arrangement of the parts without departing from the spirit of the invention.

What is claimed is:

In a produce cutter, the combination which comprises a pair of straight levers, arcuate inwardly directed arms with cutting blades on extended ends extended from one end of the levers, means pivotally connecting the levers at the points of mergence with said arms, outwardly bowed rods providing guards positioned on one of the sides of the arms, said rods extending laterally of said arms and connected at their upper ends to the arms adjacent the pivotal connection thereof, and at their lower ends to the arms adjacent the cutting blade thereon, handles on ends of the levers opposite to the ends from which the arcuate arms extend, one of said levers being provided with a lug and the other with a boss, aligned with the lug, a stop screw threaded into the boss and positioned to engage the lug to limit the closing movements of the levers and sleeves extended upwardly from the upper ends of the levers for securing the handles to said levers.

References Cited in the file of this patent

UNITED STATES PATENTS

| | | |
|---|---|---|
| 576,326 | Reed | Feb. 2, 1897 |
| 852,245 | Stewart | Apr. 30, 1907 |
| 863,111 | Smohl | Aug. 13, 1907 |
| 2,062,472 | Neuhausen | Dec. 1, 1936 |
| 2,574,932 | Nohl | Nov. 13, 1951 |